United States Patent

[11] 3,580,649

| [72] | Inventors | Shigeru Araki<br>Hirakata-Shi;<br>Shozo Takahashi; Ichiro Muto, Osaka, Japan |
|------|-----------|------|
| [21] | Appl. No. | 849,449 |
| [22] | Filed | Aug. 12, 1969 |
| [45] | Patented | May 25, 1971 |
| [73] | Assignee | Matsushito Electric Industrial Co. Ltd.<br>Osaka, Japan |
| [32] | Priority | Aug. 15, 1968, Dec. 7, 1968 |
| [33] | | Japan |
| [31] | | 43/58793, 43/89800 and 43/89801 |

[54] HIGH THRUST BEARING APPARATUS
5 Claims, 4 Drawing Figs.
[52] U.S. Cl. .................................................... 308/233
[51] Int. Cl. .................................................... F16c 19/10
[50] Field of Search ........................................ 308/227, 233, 229, 234, 230, 231

[56] References Cited
FOREIGN PATENTS

| 1,075,101 | 5/1957 | Germany .................... | 308/231 |
| 1,307,778 | 9/1962 | France ........................ | 308/227 |

Primary Examiner—Martin P. Schwadron
Assistant Examiner—Frank Susko
Attorney—Stevens, Davis, Miller and Mosher ABSTRACT: A plurality of thrust bearings to be subjected to a thrust load are arranged coaxially around a thrust shaft. A volumetrically variable air space is formed on one side of each thrust bearing opposite to the load, by means of rigid parts, without using an elastic element such as a bellows, and fluid pressure is supplied to the respective air spaces from a common fluid pressure source so as to create an equal cushioning effect in the respective thrust bearings, whereby the thrust load is taken equally by the respective thrust bearings.

PATENTED MAY 25 1971 3,580,649
SHEET 3 OF 3
PRIOR ART FIG. 3
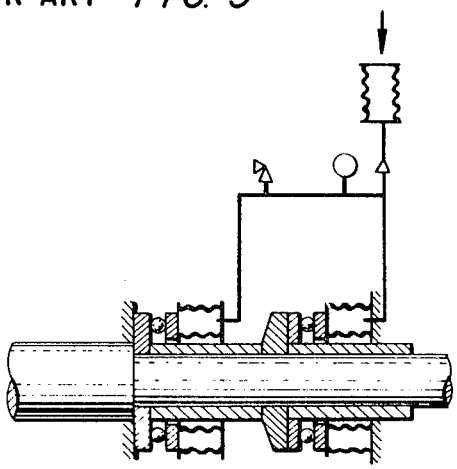
PRIOR ART FIG. 4
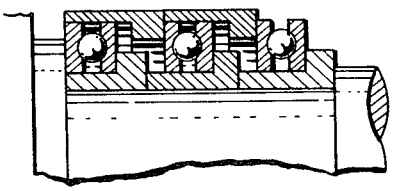

HIGH THRUST BEARING APPARATUS

The present invention generally relates to the so-called compound thrust bearings having a plurality of thrust bearing units arranged coaxially for receiving a thrust load, and more particularly relates to such a high thrust bearing apparatus in which an air space is formed on the opposite side of each thrust bearing unit with respect to the load by means of rigid parts, without using an elastic element, such as a bellows, and fluid pressure is introduced into the respective air space from a common fluid pressure source to provide a cushion for the thrust bearing units, whereby the thrust load is taken equally by the respective thrust bearing units.

In conventional single thrust bearings, it has been customary to increase the sizes of the balls and the races for enhancing the durability of the bearings or to increase the number of balls by arranging them concentrically for enhancing the load bearing capability. However, either method has usually resulted in an increasing outer diameter of the bearing proper relative to a bearing apparatus in which it is used, and by this reason the load carrying capability of a single thrust bearing has been subjected to a limitation. With reference to a compound thrust bearing, on the other hand, there has been used one which, as shown in FIG. 4, is composed of N number of single row thrust bearings, N number of inner collars and N-1 number of outer collars. In such bearing apparatus, however, a thrust load cannot be taken equally by the respective thrust bearings unless the dimensional errors of the thrust bearings are reduced to substantially zero. In view of the above, a compound thrust bearing apparatus of the type shown in FIG. 3 has been considered in which a hydraulic cushion element consisting of a bellows and adapted to sealably contain high pressure fluid therein is provided in contact with the race of each bearing and communicating the respective fluid cushion elements with a common source of pressure fluid through conduits, thereby to equalize the load taken by the respective bearings. However, a bearing apparatus of the type described above which is completely satisfactory for practical use, has not yet been materialized at the present time because of the following disadvantages. Namely, when the bellows is used, the pressure which the bellows can withstand is restricted by the material of which said bellows is made and a considerable expenditure is required for obtaining a bellows sufficiently resistive to high pressures. In addition, since the effective pressure-receiving area of the bellows is limited by the thickness and the dimensions of the folds of the bellows, the outer diameter of the bellows becomes considerably large relative to the diameter of the thrust shaft.

The present invention is concerned with so-called compound thrust bearing apparatus which are capable of carrying a thrust load substantially larger than that carried by the conventional types of bearing apparatus as described above.

Namely, an object of the present invention is to equalize the thrust load to be carried by the respective thrust bearings in the compound thrust bearing apparatus by taking the thrust load imposed on the respective thrust bearings by an end faces of a plurality of sleeves which are slidable relative to the thrust shaft and the housing under fluid pressure, and engaging flanges formed on the thrust shaft with said respective thrust bearings; and thereby to increase the load capacity of the bearing apparatus.

Another object of the invention is to provide a thrust shaft for use in the high thrust bearing apparatus, which is composed of a plurality of shaft sections connected with each other, so as to facilitate the production of the thrust shaft and to facilitate the assembly and disassembly of a hydraulic cushion means by which the thrust load is effectively carried.

Still another object of the invention is to provide a bearing support mechanism for use in the high thrust bearing apparatus of the character described above, which is adapted to support the bearings in a stable manner even in the absence of a load.

Still another object of the invention is to provide a high thrust bearing apparatus having at least two parallel thrust shafts incorporated therein in adjacent relation to each other, or a multiple shaft high thrust bearing apparatus, which is obtained by using in the high thrust bearing apparatus of the character described above a plurality of but smaller diameter bearings. (The embodiment described herein incorporates the thrust shafts.)

Still another object of the invention is to provide load detecting means for use with a high thrust bearing apparatus of the type which is provided with hydraulic cushion means to enable each bearing to carry a thrust load, said load detecting means lending itself to the purposes of precluding an unexpected concentrated load being imposed on the thrust bearings and thereby protecting said thrust bearings.

FIG. 3 is a diagram illustrating the principle of a conventional compound thrust bearing apparatus using bellows; and FIG. 4 is a sectional view of a conventional thrust bearing apparatus incorporating no cushion.

Figure 1:
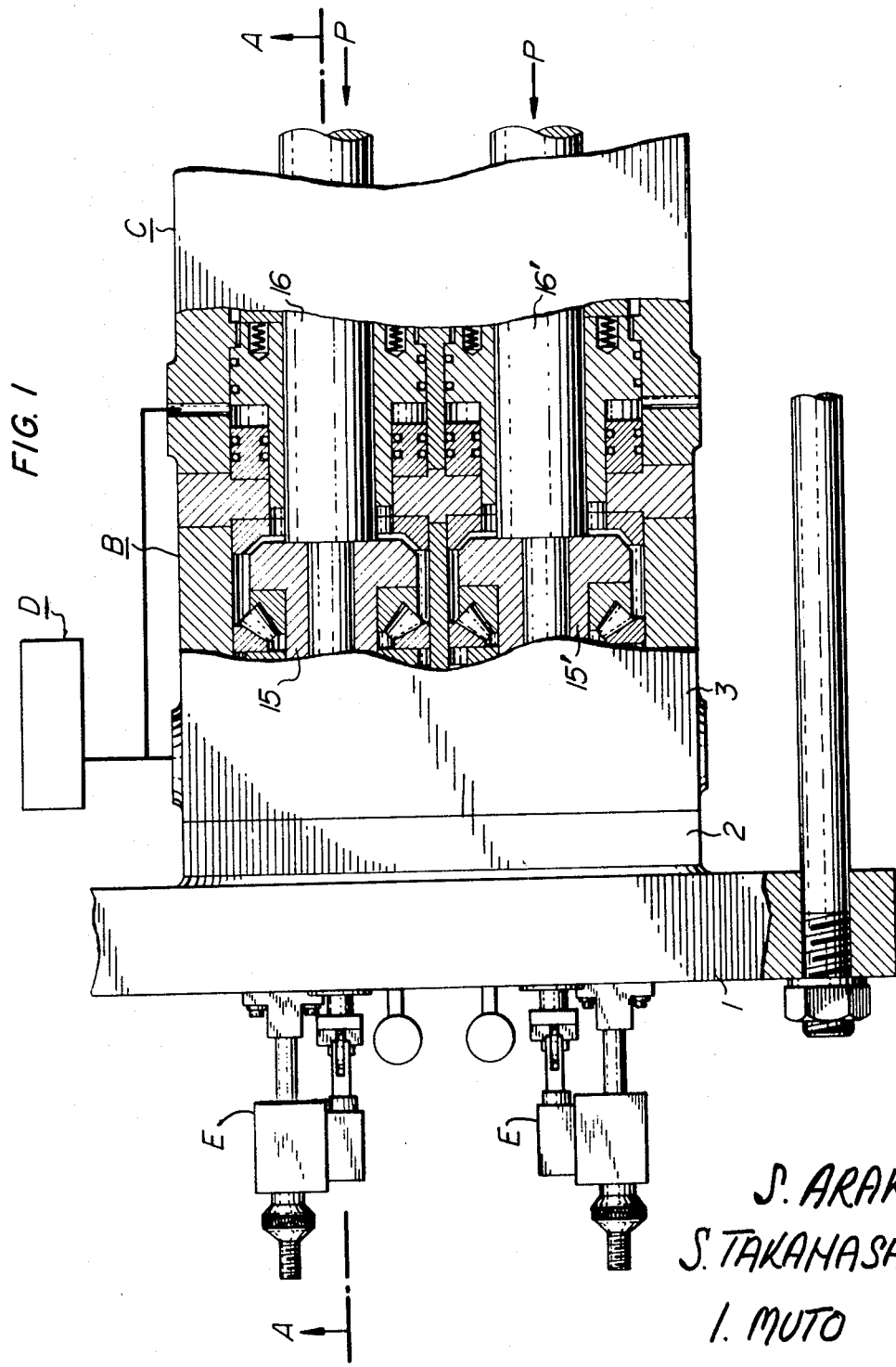
FIG. 1 is an overall view, partially broken away, of an embodiment of the high thrust bearing apparatus according to the present invention.
Figure 2:
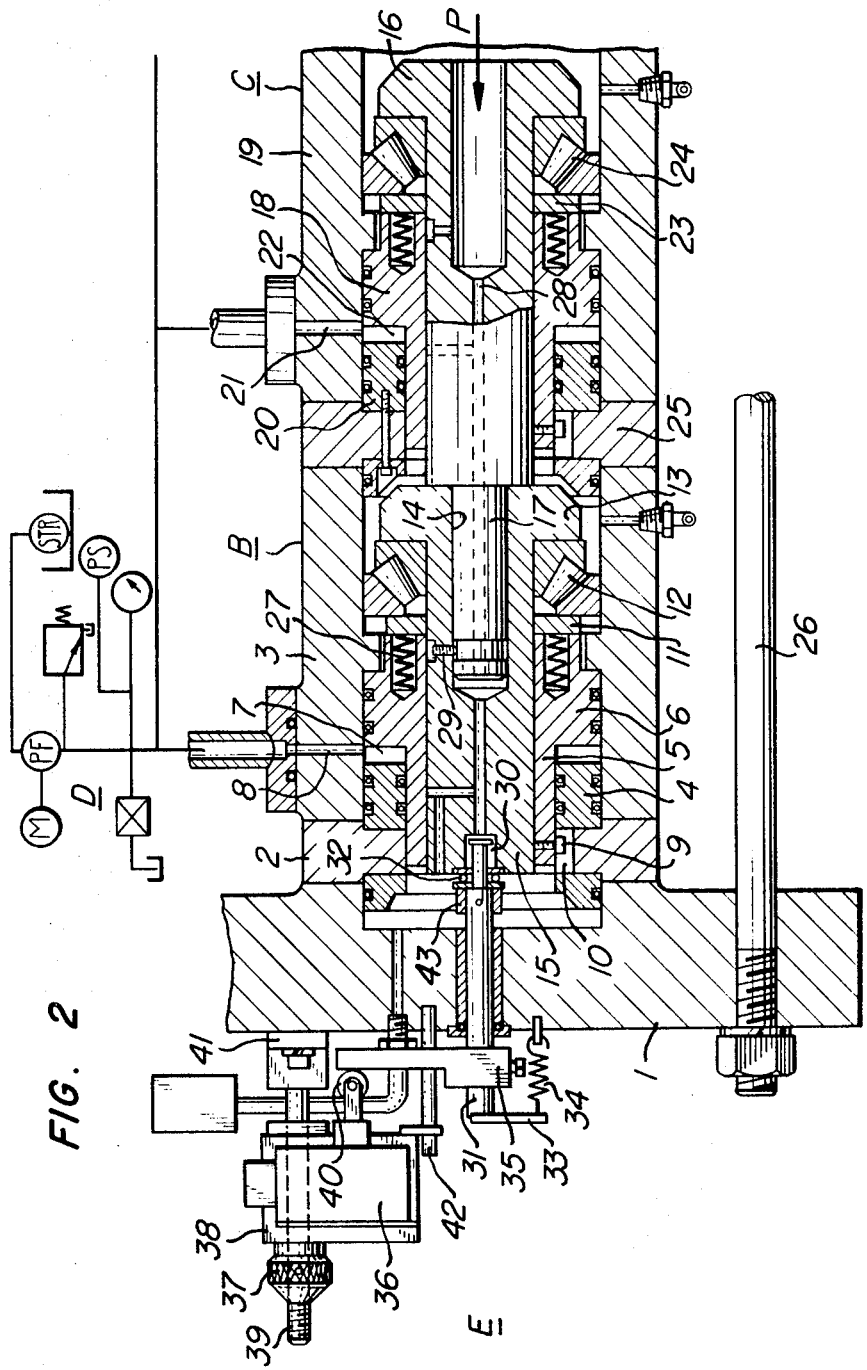
FIG. 2 is a sectional view taken on the line A-A of FIG. 1.

A preferred embodiment of the high thrust bearing apparatus of this invention will be described with reference to FIGS. 1 and 2. In FIG. 1, there is shown two shafts 16, 16' each to be subjected to a thrust load P, being supported by a hydraulically cushioned bearing apparatus according to the present invention in adjacent relation to each other. The bearing apparatus comprises a main body consisting of elliptic cylindrical bearing blocks B and C combined with each other, fluid pressure supply means D for supplying fluid into hydraulic cushion means of said respective bearing blocks under the same pressure through the sidewalls of the bearing blocks, and abnormal load detecting means E provided at that end of the bearing apparatus which is located on the opposite side with respect to the direction of load imposed on the shafts 16, 16'.

Now, details of the main body of the bearing apparatus will be explained with reference to FIG. 2. As shown, the main body has a closure member 1 on which the abnormal load detecting means E, mentioned above with reference to FIG. 1, is mounted. A spacer 2, fitted on the closure member 1 and consisting of an elliptic plate, has two circular holes bored therethrough for receiving sleeves 6 (to be described later) therein, which sleeves are loosely mounted around thrust shafts 15, 15' respectively. Disposed in adjoining relation to the spacer 2 is a housing member 3 in the shape of an elliptic cylinder having two cylindrical bores formed therein, with the thrust shafts 15, 15', thrust bearings and hydraulic cushioning means disposed in said respective cylindrical bores as will be described hereinafter. The closure member 1, the spacer 2 and the housing member 3 are tightly combined with each other in the order mentioned to form a unitary piece. In the inner bottom of each bore formed in the housing member 3 is fixedly mounted a fluid pressure receiving ring 4. A cylindrical sleeve 6 disposed in each bore has a reduced diameter portion 5 formed on that end thereof which is located on the side opposite to the direction of a load and said reduced diameter portion 5 extends through the fluid pressure receiving ring 4 in liquid sealing engagement therewith, whereby a fluid reservoir 7 is formed between said fluid pressure receiving ring 4 and a shoulder connecting the surface of the reduced diameter portion and the surface of the body portion of said sleeve 6. The fluid reservoir 7 thus formed is communicated with a fluid supply hole 8 formed through the wall of the housing member 3. The sleeve 6 is held against rotation relating to the spacer 2 but is only permitted to slide axially in the bore, by a stopper pin 9 which is screw-threaded through the wall of the reduced diameter portion 5 with its outer end extremity being received in an axial groove 10 formed in the inner surface of the spacer 2.

On the other hand, the thrust bearing 12 is mounted on the other end of the sleeve 6 through a support ring 11. In the embodiment shown, a taper roller bearing is used for the thrust bearing and use of such taper roller bearing is of practical advantage in that it is possible to reduce the thrust load which the bearing in each stage is subjected to. The thrust shaft 15 of the last stage is fitted through the thrust bearing 12, the bearing support ring 11 and the sleeve 6, with a flange 13 of said thrust shaft in engagement with the thrust bearing 12, in such a manner that the thrust shaft 15, and the support ring 11 and the sleeve 6, form a unit. Thus, the unit bearing block B is assembled.

Then, the bearing block C is connected to the bearing block B, which has the same construction as that of the latter as described above, with the only exception that an intermediate thrust bearing 16 has a projection 17. In the embodiment described and illustrated herein, the bearing apparatus comprises the two bearing blocks B and C connected with each other, the number of bearing blocks assembled in the bearing apparatus may optionally be selected in proportion to the magnitude of the thrust load to the taken by the apparatus.

Namely, in combining the bearing block C with the bearing block B a fluid pressure receiving ring 20 and a sleeve 18 are mounted in a housing member 19 having a spacer 25 provided at one end thereof, in such a manner as to form a fluid reservoir 22 between said fluid pressure receiving ring 20 and said sleeve 18 for communication with a fluid supply hole 21, and then the intermediate thrust shaft 16 is inserted into the sleeve 18 with a thrust bearing 24 interposed therebetween which thrust bearing is fitted to an end of said sleeve through a bearing support ring 23. The projection 17 of the intermediate thrust shaft 16, received in a bore 14 of the last stage thrust shaft 15 is secured to said thrust shaft 15 by means of a screw 29, whereby both thrust shafts 15, 16 are integrated with each other to form one thrust shaft. Thereafter, the other bearing blocks of the same construction as that of the bearing block C may be connected to said bearing block C in sequence, as required, by inserting and securing the projection of the thrust shaft of the successive bearing block 16 in the bore 32 formed in the thrust shaft of the preceding bearing block, in the manner described above.

The fluid supply holes 8, 21 formed through the walls of the respective housing members 3, 19 are communicated with the same fluid pressure supply means D, so that the thrust load may be taken uniformly by the respective bearing blocks B, C under the fluid pressure supplied from said fluid pressure supply means D. The bearing blocks B, C are tightly combined with each other by means of stay bolts 26 secured to the closure member 1 at the ends thereof. In FIG. 2, reference numeral 27 designates springs which bias the bearing support ring 11 and thereby maintain the race of the thrust bearing 12 in a stable position (so as not to permit the balls to drop from said race) even when the thrust load is removed from said thrust bearing, and thus the bearing apparatus can be used to take loads not only in a downward direction but also in any other direction. Reference numeral 28 designates a lubrication oil supply channel for the lubrication of the engaging surfaces of the shafts 15, 16 and the sleeves 6, 18.

As regards the materials of the main components of the present bearing apparatus, it is preferable for the thrust shafts 15, 16 to be made of a special steel, the housing members 3, 19 and the spacers 2, 25 to be made of a cast steel, the fluid pressure receiving rings 4, 20 to be made of a soft steel, and the sleeves 5, 18 to be made of a special steel so that they may not be subjected to a deformation under fluid pressure. A bushing of soft metal may be provided on the inner surface of each sleeve in contact with the thrust shaft 15 or 16, as required, though not apparent in the drawings.

Next, the abnormal load detecting means E will be described in detail with reference to FIG. 2. The abnormal load detecting means is associated with the thrust shaft 15 through a detecting pin 31 which is loosely received at one end in a recess 30 formed in an end face of said thrust shaft on the side opposite to the loaded side. The other end of the detecting pin 31 extends outwardly through the closure member 1 and is constantly biased by a spring 34 through a member 33 in a direction opposite to the direction of a load. An arm 35 is fixed to the detector pin 31 for actuating a microswitch 36 by which current supply to an associated drive source is interrupted upon occurrence of an abnormal load. The microswitch 36 is mounted on a frame-shaped bracket 38 and a thimble 37 is rotatably mounted on the bracket 38. A tapped sleeve 39 extends through the thimble 37 in threadable engagement therewith. The arrangement is such that by rotating the thimble 37, the microswitch 36 is displaced and thereby the microswitch actuating point is shifted. Reference numeral 40 designates a microswitch actuating roller, 41 a fitting for fixing the tapped sleeve 39 at one end thereof, 42 a rod member which holds the microswitch mounting bracket 38 against rotation and simultaneously serves as a guide during displacement of the microswitch, and 43 a collar fixed on the detecting pin 31 by a pin for engagement with a thrust bearing 32.

The abnormal load detecting means having a construction as described above operates in the following manner: First of all, the microswitch 36 is set in a position selected in accordance with an allowable stroke of the thrust shaft 15 and then the hydraulic circuit of the fluid pressure supply means D in communication with the fluid reservoir 7 is opened to slowly build up the fluid pressure in said fluid reservoir to a predetermined level. After ascertaining that the hydraulic system is maintained at a normal pressure, the bearing apparatus embodying the present invention is set in operation. During operation, the thrust load P is uniformly absorbed by the hydraulic cushion created in the fluid reservoir, through the flange 13 of the thrust shaft 15 and the thrust bearing 12. When the bearing apparatus is operated normally as above described, the fluid pressure is balanced with the thrust load and the thrust shaft 15 is maintained with range of its allowable stroke. However, if an abnormal concentrated load occurs in the bearing apparatus, the thrust shaft 15 is displaced to the left as viewed in the drawings, urging the detecting pin 31 outwardly, so that the microswitch actuating arm 35 is displaced accordingly to actuate the microswitch 36. Actuation of the microswitch 36 results in interruption of the current supply to the drive source, whereby the condition of abnormal load is eliminated. (Such condition of abnormal load will occur, for example, when the thrust shaft is allowed to move backward due to a fluid leakage occurring in the hydraulic circuit and thereby the clearance in which the hydraulic cushion is created is eliminated.

As described above, the detecting means of this invention is capable of detecting an abnormal load for the bearing apparatus and thereby removing the condition of such abnormal load. Therefore, the use of the detecting means is advantageous in protecting the thrust bearings and other parts of the apparatus, and prolonging the service lives of the same. The other meritorious features of the detecting means used in the present invention are that adjustment of a set value of abnormal load to be detected can be attained simply and finely, only by rotating the thimble 37 and that the detecting means is very simple in structure and can be readily mounted on the bearing apparatus.

The bearing apparatus of the invention constructed as described herein is adapted for use with an apparatus, such as screw press, which rotates under a high thrust. In use of the bearing apparatus, the hydraulic circuit of the fluid pressure supply means D is opened at first to increase the pressure in the hydraulic line in the apparatus gradually until it reaches a predetermined level and then the bearing apparatus is set in operation upon ascertaining that the hydraulic line is maintained at normal pressure. With the bearing apparatus in operation, a thrust load P is uniformly absorbed by the hydraulic cushion, created in the fluid reservoirs 7, 22, through the thrust bearings 12, 24, the bearing support rings 11, 23 and the sleeves 6, 18 respectively.

Since, according to the present invention, a thrust load is equally taken by all stages of the the compound thrust bearing, the individual thrust bearings used in the present bearing apparatus can be of the inexpensive type which is normally available on the market. Moreover, since the present bearing apparatus is composed of a plurality of bearing block units combined together, a bearing apparatus capable of bearing a given thrust load can readily be composed and replacement of a damaged part in each bearing block unit can simply be achieved. According to the present invention, a plurality of the bearing blocks can be assembled in adjoining relation to each other as shown in FIG. 1, so that the bearing apparatus can be designed so as to have a relatively small outer diameter. In addition, since air bubbles in the hydraulic line can be removed by the reciprocating sleeves, satisfactory and smooth hydraulic cushioning can be obtained.

What we claim is:

1. A high thrust bearing apparatus comprising a plurality of sleeves loosely mounted on a shaft to be subjected to a thrust load and being slidable under fluid pressure relative to housing members which accommodate said sleeves respectively; flanges formed integrally with and extending radially outwardly from said shaft between adjacent ones of said sleeves; thrust bearings each disposed between said sleeve and said flange so that the thrust load imposed on the shaft may be taken by said respective sleeves; and a fluid reservoir formed on that side of each of said sleeves opposite to the loaded side and filled with fluid supplied thereinto, whereby the load imposed on said respective thrust bearings is equalized, said shaft consisting of a compound shaft composed of a number of sections equal to the number of said thrust bearings and having an axially extending lubricant supply channel formed therein throughout the length thereof, and said shaft sections being connected with each other by the interlocking engagement between a projection extending axially from one end of one section and a corresponding bore formed in the confronting end of the adjacent section.

2. A high thrust bearing apparatus comprising a plurality of flanges formed on a shaft to be subjected to a thrust load, thrust bearing provided in abutting relation to said respective flanges, sleeves each provided on the opposite side of said thrust bearing with respect to each flange and being slidable relative to said shaft, said sleeves taking the thrust load imposed on said shaft through said respective flanges and thrust bearings, a fluid reservoir formed on the side of each of said sleeves opposite to the loaded side and filled with fluid supplied thereinto to create a hydraulic cushion for absorbing the load taken by said respective sleeves, and bearing support rings each disposed between said thrust bearing and said sleeve and being urged against the associated thrust bearing by a spring so as to maintain the race of said thrust bearing stable upon removal of the thrust load.

3. A high thrust bearing apparatus comprising a housing, combined shaft means constituted by a plurality of shafts mounted in said housing, each of said shafts having a flange for transmitting an imposed thrust load and a bore and a projection respectively at the opposite end surfaces thereof for connection with adjacent shafts thus constituting said combined shaft means; thrust bearings fitted over each of said shafts; sleeves mounted on each of said shafts to hold said thrust bearing between said flange on said shaft and said sleeve, said sleeves being slidable under fluid pressure relative to said housing; and a fluid pressure supply means adapted for supplying an equalized fluid pressure into a fluid reservoir formed on the side of each of said sleeves opposite to the loaded side so that load imposed on each of said thrust bearings is equalized.

4. A high thrust bearing apparatus comprising at least two hydraulically cushioned compound bearings having at least two combined shaft means arranged in parallel and closely adjacent relation to each other, each of said compound bearings comprising housing and spacer means alternately arranged in the axial direction and defining a cavity therein; each shaft of said combined shaft means having a radial flange for transmitting an imposed thrust load and a bore and a projection, respectively, at the opposite end surfaces thereof to be connected with adjacent shafts thus constituting one of said combined shafts; at least two thrust bearings one of which is fitted over each of said shafts; at least two sleeves one of which is mounted on each of said shafts to hold said thrust bearing between said flange provided on said shaft and said sleeve, said sleeve being slidable under fluid pressure relative to said housing; and a fluid pressure supply means adapted for supplying an equalized fluid pressure into a fluid reservoir formed on the side of each of said sleeves opposite to the loaded side, whereby a load imposed on each of said thrust bearings is wholly equalized.

5. A high thrust bearing apparatus comprising at least one combined shaft means constituted by a plurality of shafts mounted in a housing, each of said shafts having a flange for transmitting an imposed thrust load and a bore and a projection, respectively, at the opposite end surfaces thereof for connection with other shafts thus forming one of said combined shaft means; thrust bearings, one of which is fitted over each of said shafts; sleeves mounted on each of said shafts to hold said thrust bearing between said flange provided on said shaft and said sleeve, said sleeve being slidable under fluid pressure relative to said housing; a fluid pressure supply means adapted for supplying an equalized fluid pressure into a fluid reservoir formed on the side of each of said sleeves opposite to the loaded side; and abnormal load detecting means associated with said combined shaft means, each of said detecting means comprising a detecting pin adapted to detect axial displacement of said shaft means and a microswitch adapted to be actuated by said axial displacement of said shaft means through said detecting pin; and means for adjusting the actuating point of said microswitch, whereby the load imposed on said respective thrust bearings is wholly equalized and an unexpected concentrated load, that is an abnormal load, may be detected to protect said thrust bearings.

UNITED STATES PATENT OFFICE
CERTIFICATE OF CORRECTION

Patent No. 3,580,649     Dated May 25, 1971

Inventor(s) Shigeru ARAKI et al

It is certified that error appears in the above-identified patent and that said Letters Patent are hereby corrected as shown below:

The patentee is misprinted and should read as follows:

MATSUSHITA ELECTRIC INDUSTRIAL CO., LTD.

Signed and sealed this 2nd day of November 1971.

(SEAL)
Attest:

EDWARD M. FLETCHER, JR.         ROBERT GOTTSCHALK
Attesting Officer               Acting Commissioner of Patents